United States Patent [19]

Morisawa

[11] Patent Number: 5,285,425
[45] Date of Patent: Feb. 8, 1994

[54] PARKING TIME DISPLAY DEVICE EQUIPPED IN A VEHICLE WITH A MOTOR

[75] Inventor: Nobuo Morisawa, Akashi, Japan

[73] Assignee: Morisawa & Co., Ltd., Osaka, Japan

[21] Appl. No.: 702,379

[22] Filed: May 20, 1991

[30] Foreign Application Priority Data

Jul. 13, 1990 [JP] Japan .................. 2-185517

[51] Int. Cl.$^5$ .................. G04B 37/00; G04F 8/00
[52] U.S. Cl. .................. 368/10; 368/6; 368/8
[58] Field of Search .................. 368/6-9, 368/89, 90

[56] References Cited

U.S. PATENT DOCUMENTS

| | | | |
|---|---|---|---|
| 1,510,612 | 10/1924 | Skaer | 368/7 |
| 1,905,875 | 4/1933 | Hutches, Jr. | 368/7 |
| 2,240,726 | 5/1941 | Tucker | 368/8 |
| 2,289,362 | 7/1942 | Hickey | 368/9 |
| 2,543,946 | 3/1951 | Tener | 368/8 |
| 4,293,842 | 10/1981 | Tanaka et al. | 368/7 |

*Primary Examiner*—Bernard Roskoski
*Attorney, Agent, or Firm*—Sandler Greenblum & Bernstein

[57] ABSTRACT

A parking time display device is provided in a car to display the time during which the car is parked. The parking time display device includes a sensor for detecting a stopping or parking condition of the car, a counter for counting time, a control circuit for controlling the counter, and a display. The display is arranged at a portion of the car which is visible from outside of the car.

10 Claims, 2 Drawing Sheets

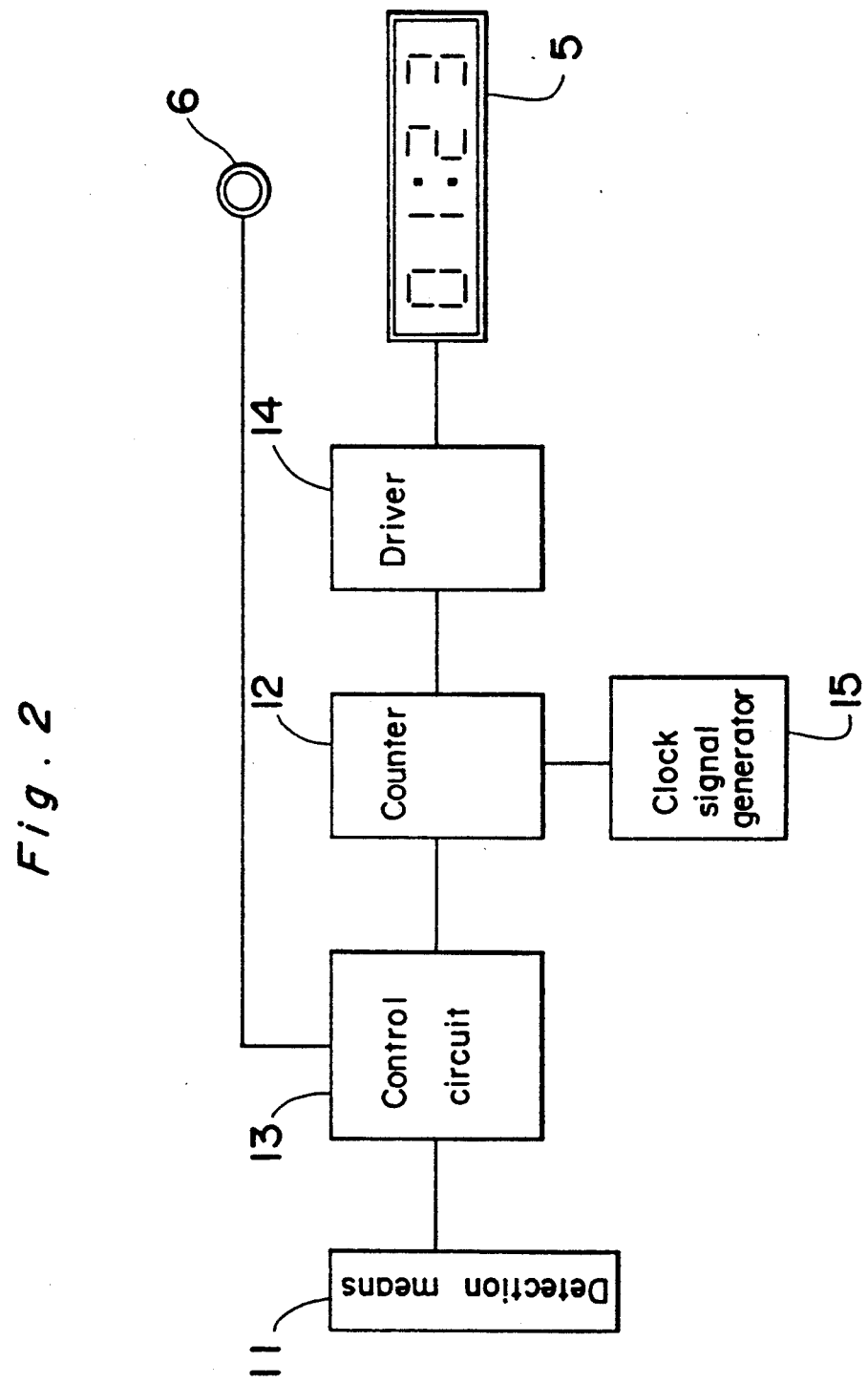

PARKING TIME DISPLAY DEVICE EQUIPPED IN A VEHICLE WITH A MOTOR

BACKGROUND OF THE INVENTION

The present invention relates to a parking time display device installed in a vehicle for displaying a parking time of the vehicle.

Among various urban problems, unlawful parking is a serious one; unlawful parking often causes heavy traffic jams, and is very difficult to strictly control. Usually, it is deemed unlawful to stop or park a car at a place not admitted over a predetermined time. Accordingly, it is important to know how long the car has been stopped or parked at that place in order to control such unlawful parkings.

However, one can not know usually whether or not a car has been stopped or parked illegally at a glance, unless the parking spot is provided with a parking meter. Although the parking meter can warn when a predetermined parking time has elapsed, it does not serve as an adequate monitor of unlawful parking, since a payment of an additional parking fee cancels such an unlawful state alleged.

SUMMARY OF THE INVENTION

An essential object of the present invention is to provide a parking time display device for displaying a parking time of a vehicle which is installed therein.

Another object of the present invention is to provide a display means which allows everyone to recognize a parking time of a parked vehicle at a glance.

A further object of the present invention is to provide a parking time display device of a vehicle which starts to count a parking time automatically when the vehicle is stopped or parked.

BRIEF DESCRIPTION OF DRAWINGS

These and other objects and features of the present invention will become clear from the following description taken in conjunction with the preferred embodiments thereof with reference to the accompanying drawings in which:

FIG. 2 is a block diagram of a parking time display device for a vehicle according to the present invention.

DETAILED DESCRIPTION OF THE PREFERRED EMBODIMENT

Figure 1:
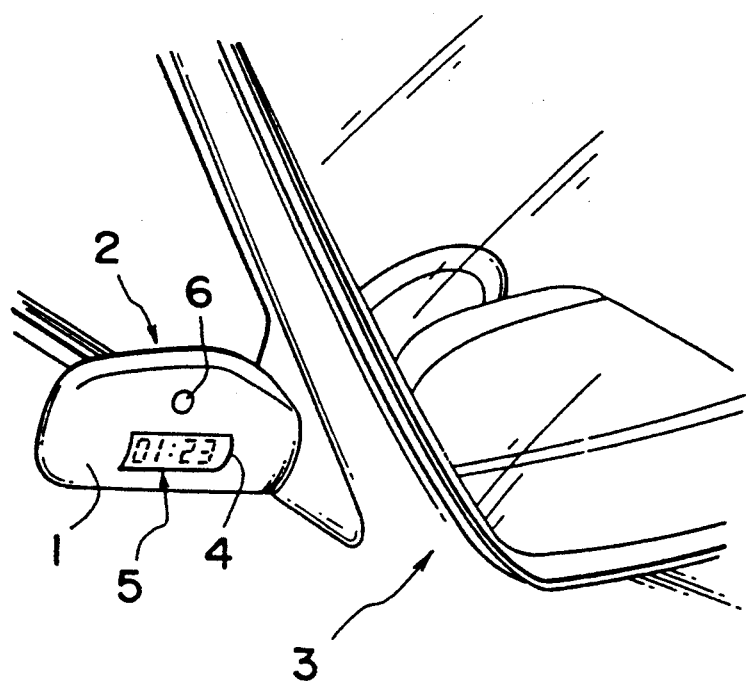
FIG. 1 is a partial perspective view of a car having a side mirror to which the present invention is applied.

As shown in FIG. 1, a holder case 1 of a side mirror 2 of a car 3 has a small display window 4 for displaying a parking time of the car at the rear wall portion thereof. Inside of said display window 4, there is provided a digital display means 5 such as a liquid crystal display or the like. In FIG. 1, the display means 5 indicates, for instance, one hour and 23 minutes as a parking time during which the car has been stopped or parked. It is convenient to arranged a pilot lamp 6 at upper side of the display 5 for indicating that the parking time display device is in operation.

Figure 3:
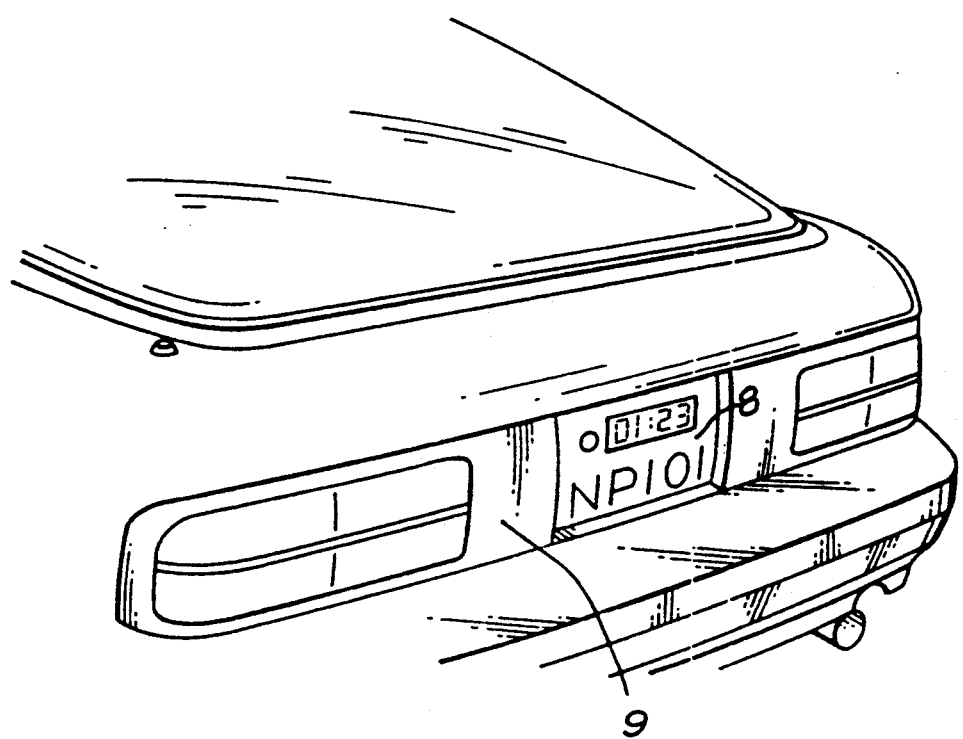
FIG. 3 is a partial rear view of a car having a parking time display device wherein the display means thereof is arranged near the number plate thereof.

The display means 5 can be arranged at any portion of the car provided that one can observe it from the outside thereof. For instance, in FIG. 3, it is arranged on a number plate 8 which is mounted on a rear end panel 9 thereof.

FIG. 2 shows a block diagram of the parking time display device.

The device comprises detection means 11 for detecting a stopped or parked state of a car, a counter 12 for counting a time, a control circuit 13 for starting and resetting said counter 12, a driver circuit 14 and said digital display means 5.

The detection means 11 can be a switch which is switched on or off when an accel-pedal of a car is released or a side (parking) brake lever is operated to park the car. Detection means 11 may also include a switch which cooperates with an ignition key to detect that the same is operated to a stop position thereof. Further, it may be an idle switch which is operated when the car is brought to an idle state.

The control circuit 12 makes the counter 12 start when the detection means 11 detects a stop or parking of the car. The counter 12 counts clock pulses generated by a clock signal generator 15 when started. The driver 14 drives the four digit digital display 5 in accordance with output signals from the counter 12.

The controls circuit 13 also control the pilot lamp 6 to turn on when the detection means outputs a detection signal.

When the car is restarted and the detection means 11 is thereby switched off, the control circuit 13 resets the counter 12 and, accordingly, the display 4.

No further explanation about compositions of the control circuit 13, the counter 12, the driver 14 and the clock signal generator 15 are provided as these elements are well known to those skilled in the art.

However, it is to be noted that the parking time display device should be backed-up by a battery (not shown) after the ignition key switch is switched off.

Further, it is to be noted that a microcomputer can be utilized to control the parking time display device instead of the control circuit 13.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In combination with a vehicle, a parking time display device for displaying the time during which the vehicle has been parked, said device comprising:

means for displaying a parking time of said vehicle at a location observable from a position outside of said vehicle, said display means comprising electronic digital means for displaying a numerical indication in a plane which is substantially flush with an exterior surface of said vehicle, said displaying means comprising a pilot lamp positioned on a body of said vehicle for indicating that said display device is in operation, means for automatically turning said pilot lamp ON when said vehicle is parked, said vehicle comprising a side mirror mount and said displaying means is positioned within an exterior surface of said side mirror mount, detecting means for detecting a parked state of said vehicle and for outputting a detection signal when said parked state is detected, counting means for counting time, and control means for starting said counting means when said detection signal is output from said detection means, for enabling said displaying means to display the time counted by said counting means.

2. The parking time display device according to claim 1, wherein said numerical indication comprises a row of digits.

3. The parking time display device according to claim 1, wherein said displaying means comprises an electronic digital display.

4. The parking time display device according to claim 1, wherein said exterior surface of said side mirror mount extends vertically at a side of said mirror mount which is opposite a mirror located within said mirror mount.

5. The parking time display device according to claim 1, further comprising:
  detection means for detecting a state of said vehicle and for outputting a detection signal when said state is detected;
  count means for counting time; and
  control means for starting said count means when said detection signal is output from said detection means and for enabling said displaying means to display the time counted by said count means.

6. In combination with a vehicle, a parking time display device for displaying the time during which the vehicle has been parked, said vehicle comprises an area for receiving a number plate, said device comprising:
  means for displaying a parking time of said vehicle at a location observable from a position outside of said vehicle, said displaying means comprising an electronic digital display provided within said number plate receiving area, a pilot lamp positioned on a body of said vehicle for indicating that said display device is in operation, means for automatically turning said pilot lamp ON when said vehicle is parked, detecting means for detecting a parked state of said vehicle and for outputting a detection signal when said parked state is detected, counting means for counting time, and control means for starting said counting means when said detection signal is output from said detection means, for enabling said displaying means to display the time counted by said counting means.

7. In combination with a vehicle, a parking time display device for displaying the time during which the vehicle has been parked and an area for receiving a number plate, said device comprising:
  means for displaying a parking time of said vehicle at a location observable from a position outside of said vehicle, said displaying means comprising an electronic digital display provided within said number plate receiving area, a pilot lamp positioned on a body of said vehicle for indicating that said display device is in operation, means for automatically turning said pilot lamp ON when said vehicle is parked, detecting means for detecting a parked state of said vehicle and for outputting a detection signal when said parked state is detected, counting means for counting time, and control means for starting said counting means when said detection signal is output from said detection means for enabling said displaying means to display the time counted by said counting means.

8. In combination with a vehicle, a parking time display device for displaying the time during which the vehicle has been parked, said device comprising:
  means for displaying a parking time of the vehicle at a location observable from a position outside of said vehicle, said displaying means comprising means for electronically displaying a numerical indication in a plane which is substantially flush with an exterior surface of said vehicle, a pilot lamp positioned on a body of said vehicle for indicating that said display device is in operation, means for automatically turning said pilot lamp ON when said vehicle is parked;
  said vehicle comprising an area for receiving a number plate, and said displaying means is provided within said number plate receiving area;
  detecting means for detecting a parked state of said vehicle and for outputting a detection signal when said parked state is detected,
  counting means for counting time, and
  control means for starting the counting means when said detection signal is output from said detection means for enabling said displaying means to display the time counted by said counting means.

9. The parking time displaying device according to claim 8, wherein said numerical indication comprises a row of digits.

10. The parking time displaying device according to claim 8, wherein said displaying means comprises an electronic digital display.

* * * * *